A. F. BERRY.
MEANS FOR CONTROLLING ELECTRIC HEATER CIRCUITS.
APPLICATION FILED JUNE 28, 1915.

1,186,270.

Patented June 6, 1916.

Inventor:
Arthur F. Berry,
by Albert G. Davis
His Attorney

UNITED STATES PATENT OFFICE.

ARTHUR FRANCIS BERRY, OF EALING, ENGLAND, ASSIGNOR TO GENERAL ELECTRIC COMPANY, A CORPORATION OF NEW YORK.

MEANS FOR CONTROLLING ELECTRIC-HEATER CIRCUITS.

1,186,270. Specification of Letters Patent. Patented June 6, 1916.

Application filed June 28, 1915. Serial No. 36,678.

*To all whom it may concern:*

Be it known that I, ARTHUR FRANCIS BERRY, a subject of the King of Great Britain, residing at Ealing, county of Middlesex, England, have invented certain new and useful Improvements in Means for Controlling Electric-Heater Circuits, of which the following is a specification.

My invention has reference to electric heating apparatus in which the various heating elements or devices, which will hereinafter be referred to as heaters, are controlled by switch mechanism in such a manner that the heating effect of each individual heater can be varied from time to time to suit varied requirements, and it has for its object the provision of mechanism associated with the heaters, so arranged that while the heaters can be variously brought into action to individually produce any desired degree of heat, the maximum heating effect of all the heaters cannot be produced at one time, whereby the maximum amount of electrical energy that can be used at any one time cannot exceed a predetermined safe or permissible amount. Thus, while all the heaters may be in use in some condition at one time, they are so arranged that the aggregate of the energy that may be delivered to the various devices is limited to an amount less than the sum of their maximum ratings.

In accordance with my invention, the switch-operating devices controlling the several heaters are so mechanically interlocked or controlled that while any one of them may be freely operated to obtain any degree of heat made possible by the arrangement of the heating elements controlled by the switch-operating devices, all of the switch-operating devices cannot be fully operated to produce the maximum heating effect of all of the heaters at the same time. Thus, assuming that there are five heaters, for example hot plates, each having a capacity of 1000 watts, 750 watts, and 250 watts, according to the manner in which the heating elements are connected by the corresponding switch device, and that not more than 3000 watts may be used at any one time, then the switch-operating devices may be so interlocked that any three of them may be operated to cause the corresponding heaters to produce their maximum heating effect; any four of them may be operated to cause the corresponding heating devices to produce their intermediate heating effect; and all of them may be operated to cause the several heating devices to produce their minimum heating effect.

Figure 1:
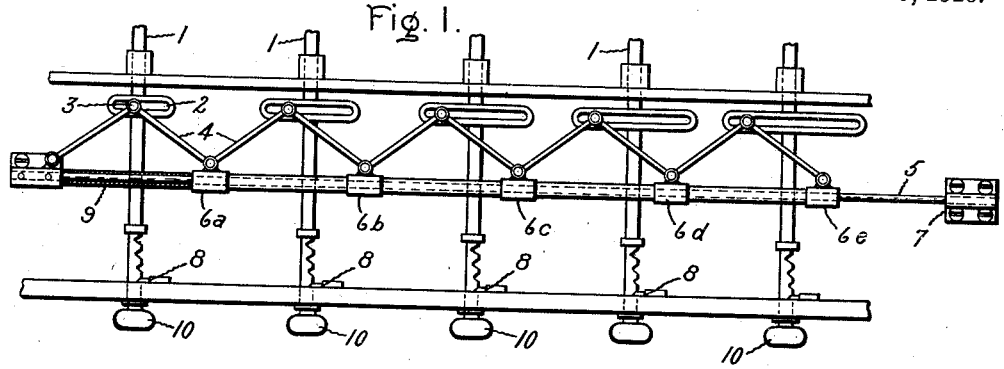
Figure 2:
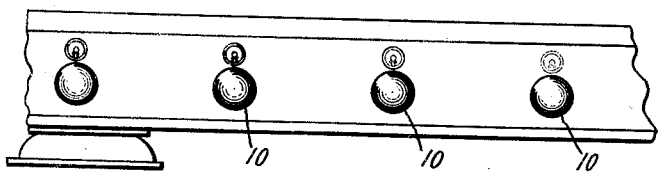
Figure 3:
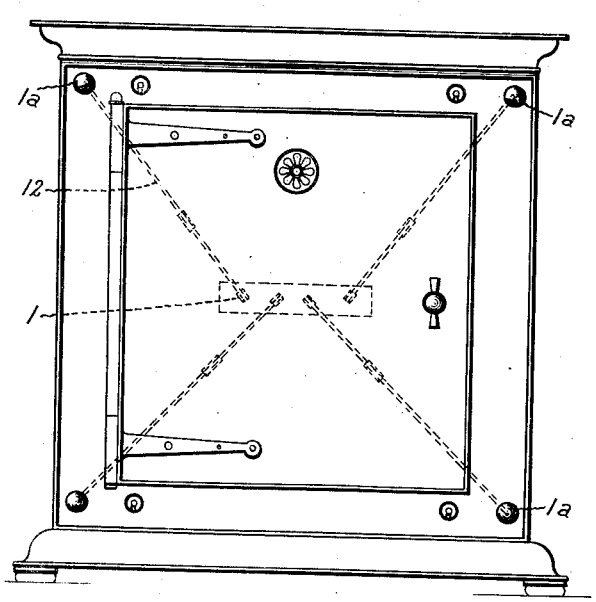
Figure 4:
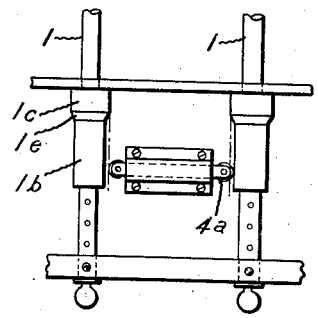
Figure 5:
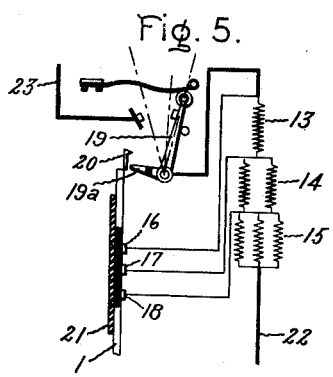

In the accompanying drawing, Figure 1 is a diagrammatic view illustrating one form of my invention in connection with switch-operating plungers and interlocking mechanism; Fig. 2 shows in front elevation part of a hot plate provided with switch-operating plungers and the interlocking mechanism of Fig. 1; Fig. 3 is a diagrammatic elevation of an oven, showing how an arrangement similar to that of Fig. 1 can be applied thereto; Fig. 4 is a modification; and Fig. 5 is a diagram showing a set of heating elements for a heating device and a switch-operating plunger and contacts controlling such elements.

In Fig. 1, five plungers 1, for the operation of corresponding switches into their different positions from the off position illustrated, are provided with transversely slotted portions 2 in which are received pins 3 upon a system of links 4. This system comprises pairs of links capable of expansion and contraction along a fixed bar 5, the ends of the links being connected to sleeves 6ª, 6ᵇ, etc., which are slidable over said bar. This expansion and contraction is brought about by the reciprocation of the plungers 1. According to this arrangement, which is intended for use where the numerical conditions are those hereinbefore referred to, one of the sleeves 6ᵉ upon the bar 5 is caused to encounter a stop 7 as soon as any three of the plungers 1 are moved to "full" position, which is represented by three steps, each step, if desired, being indexed by a spring catch 8, arranged to enter notches of different depths in the corresponding plunger for the different steps. It will thus be clear that in the particular example assumed, all the plungers 1 can be moved through at least one step, any four may be moved through two steps, and any three may be moved through three steps, while other combinations short of the maximum are obtainable. Sleeves 9 are here shown as threaded upon a bar 5, to facilitate movement of the linkage system 4, although such sleeves are not essential. As shown in Figs. 1 and 2, the plungers 1 are shown as arranged side by side and provided with handles 10 for their direct operation. Such rods may, however, be operated through connections. This is shown in Fig. 3, where the plungers 1 are actuated through levers 12 from auxiliary hand-plungers 1ª located at the corners of an oven, it being assumed in this case that four heaters and switch-operating plungers 1 are employed.

Fig. 4 illustrates a modified arrangement, suitable for use where but two switches are contemplated, each capable of being operated alone to give their different electrical circuit conditions, or together to give combinations of such circuit conditions, but so arranged as to make it impossible to obtain the maximum heating effect of the two heaters controlled thereby. Each switch plunger 1 may, for example, be formed with two parts, 1ᵇ and 1ᶜ, of different diameters, and connected by an inclined portion 1ᵉ. The different portions of the plungers thus form steps with which coöperates a slide 4ª, the arrangement being such that whenever either plunger 1 is moved to bring its part 1ᶜ, corresponding to the maximum heating effect, into register with the slide 4ª, the other plunger 1 cannot be moved to the corresponding position. In other respects, however, each of the individual plungers is freely movable.

Each of the switch operating plungers and its switch contact may be arranged to operate in such a manner that upon pulling out the plunger one step, three sets of heating elements will first be connected in series across electric supply conductors, and the lowest temperature produced; upon pulling out the plunger one step farther, one of the heating elements will be short-circuited to produce an intermediate temperature; and upon pulling out the plunger still another step, another heating element or set of parallel heating elements will be short-circuited and the maximum temperature produced.

Fig. 5 shows such an arrangement, in which a single heating element 13 is connected in series with two parallel connected heating elements 14, which are in turn connected in series with three parallel connected heating elements 15. One terminal of the heating element 13 is connected to a fixed contact 16, while the other terminal thereof, which also forms a terminal for the elements 14, is connected to a stationary contact 17, while a similar contact 18 is connected between the elements 14 and 15. The other terminal of the element 15 is connected to the line 22, the other supply conductor being indicated by the reference numeral 23. A spring-controlled switch lever 19 is actuated by a projection 20, carried by the switch-operating plunger 1, which breaks the connection between the heating elements and the supply conductor 23 when the plunger is pushed fully in, and closes this connection when the plunger is pulled out a single step. The parts are so arranged that in moving the plunger 1 from the off to the on position, the projection 20 engages the finger 19ª on the switch 19 to close the switch, and then springs over the end of the finger 19ª. This all takes place during the first step of the movement, so that the given plunger thereafter moves independently of the switch in either direction and with the switch in the closed position, until the plunger is again moved to the off position, when, during the last step of its movement, the projection 20 first moves the switch to the off position and eventually slips over the end of the finger 19ª until it occupies the position shown in Fig. 5. The plunger 1, which is provided with an insulating sliding contact 21, is so arranged as to short-circuit the heating element 13 when the plunger 1 has been moved two steps, and to short-circuit the elements 13 and 14 when the same has been moved three steps.

While I have shown one arrangement for varying the amount of energy delivered to a given device, it will, of course, be understood that any other arrangement may be used. It will also be understood that while I have described the preferred form of interlocking mechanism, any other suitable mechanism may be used.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. In combination, a plurality of heating elements, means for varying the amount of energy delivered to each element, and means associated with the first named means for limiting the aggregate of the energy that may be delivered to said elements to an amount less than the sum of their maximum ratings.

2. In combination, a plurality of heating elements, means for varying the amount of energy delivered to each element, and an interlocking mechanism associated with said means which provides for the delivery of energy to any one of the elements in accordance with its variable requirements, and which limits the aggregate of the energy that may be delivered to said elements to an amount less than the sum of their maximum ratings.

3. In combination, a plurality of heating elements, means comprising a plurality of switches associated with the respective elements for varying the amount of energy delivered thereto, and an interlocking mechanism associated with said switches which provides for the free movement of any one of the switches, but which so restricts their combined movements as to limit the aggregate of the energy that may be delivered to said elements to an amount less than the sum of their maximum ratings.

4. In combination, a plurality of heating elements, means comprising a plurality of switches associated with the respective elements for varying the amount of energy that may be delivered thereto, means comprising a plurality of manually-operated members for actuating said switches, and an interlocking mechanism associated with said members that provides for the free movement of any one member but so restricts the movements of the members as a whole that the aggregate of the energy delivered to said elements is less than the sum of their maximum ratings.

5. In combination, a plurality of heating elements, means comprising switches movable to a plurality of positions for varying the amount of energy delivered to said elements, means comprising a plurality of plungers for actuating the switches, and means associated with said plungers which provides for the free movement of any one of the same but which so restricts their combined movements as to limit the aggregate of the energy that may be delivered to said elements to an amount less than the sum of their maximum ratings.

In witness whereof, I have hereunto set my hand this 15th day of June, 1915.

ARTHUR FRANCIS BERRY.